May 8, 1945. E. J. HART 2,375,358
TOOL APPARATUS
Filed Feb. 8, 1944
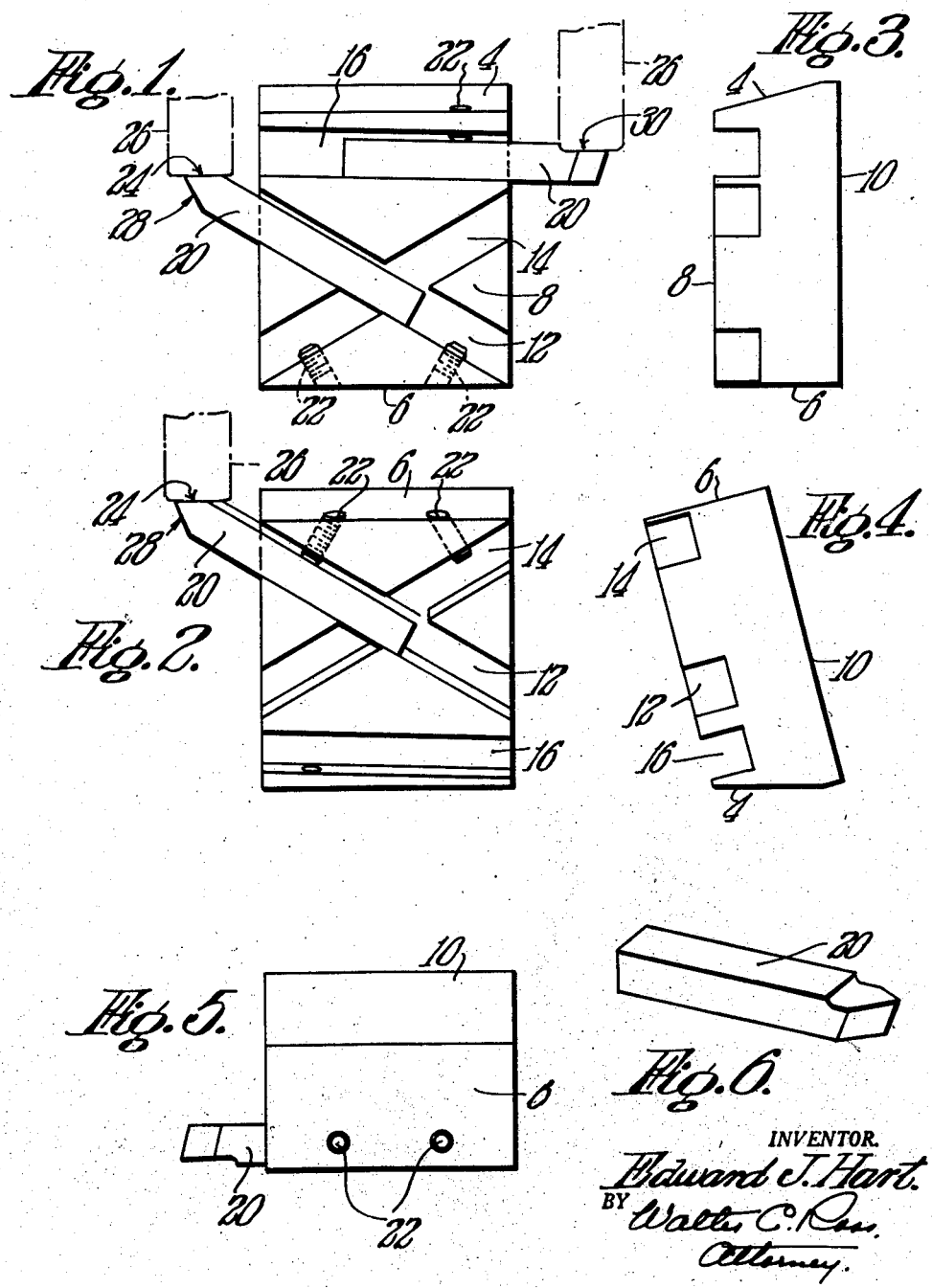
INVENTOR.
Edward J. Hart.
BY Walter C. Ross.
Attorney.

Patented May 8, 1945

2,375,358

UNITED STATES PATENT OFFICE 2,375,358

TOOL APPARATUS

Edward J. Hart, Springfield, Mass.

Application February 8, 1944, Serial No. 521,532

1 Claim. (Cl. 51—221)

This invention relates to tool apparatus and is directed more particularly to improvements in holders for tools or tool-bits.

The principal objects of the invention are directed to improvements in devices for holding tools known as tool-bits to facilitate forming the working portions thereof.

Tool bits having working portions are used in tool holders of machine tools and the principal features of this invention are the provision of a device in which a tool-bit may be clamped so that the working part of the bit may be positioned for the action of an abrasive wheel or the like to form the working part.

The device of the invention is in the form of a holder provided with slots for receiving a bit that are so relatively disposed as to present the working part thereof to an abrasive wheel for obtaining various cuts on the tool bit and the holder is formed so that it varies the position of the working part of the tool bit. The form of the holder and the bit slots thereof cooperate whereby the working part of a tool bit may be formed by shifting the bit between the slots and supporting the block on its different sides.

Various novel features and advantages of the invention will be hereinafter more fully referred to in connection with the following description of the invention in the form at present preferred taken in connection with the accompanying drawing, wherein:

Figs. 1 and 2 are front elevational views of the holder of the invention in different positions;

Fig. 3 is a side elevational view of the holder as shown in Fig. 1;

Fig. 4 is a side elevational view of the holder as shown in Fig. 2;

Fig. 5 is a plan view of the holder as shown in Fig. 2; and

Fig. 6 is a perspective view of a tool bit.

Referring now to the drawing more in detail, the invention will be fully described.

The holder of the invention includes a body in the form of a block 2 which has supporting faces 4 and 6, the former of which is non-parallel to the face 6 and is not at right angles to the front and rear faces 8 and 10.

Slots 12 and 14 for receiving a tool bit or bits are provided in the forward face of the body that intersect, as shown, and are diagonally disposed relative to the supporting faces 4 and 6.

A similar slot 16 in the forward face adjacent the supporting face 4 is arranged angularly relatively to said face 4 and to the face 6, as shown.

The slots described are adapted to receive a tool-bit or bits such as 20. Means is provided for clamping the bit or bits in the slots which may take the form of set screws 22 in threaded engagement with the block that are adapted to abut a bit and bind it against a side of a slot.

The block 2 will preferably be made from ferrous metal so that it may be engaged by the magnetic member or chuck of a machine wherein the chuck and thereby the block 2 and an element for acting on a bit in the block are relatively movable. In this way an element which may be an abrasive wheel is caused to act on the working end part of the tool bit to form the same.

The device may be used in various ways, that is a tool-bit or bits may be clamped in the slots and the block may be positioned so that the working end of a tool bit may be presented to an abrasive member in various relations. The following will, however, explain some of the uses for which the device is adapted.

With the block 2 held on a magnetic chuck in the position shown in Figs. 2 and 4 the block is tilted forwardly, as shown and a bit 20 is clamped in a slot such as 12. The end of the bit is presented so that as the block and an abrasive wheel represented by 26 are moved relative to one another the wheel acts to produce an angle or side such as 24 on the end of the bit which extends rearwardly from the point of the bit. The bit is inserted in the slot 14 so that angle 28 is similarly produced.

As shown in Fig. 6, the point of the bit below the upper forward end inclines downwardly and rearwardly as shown in Fig. 6, due to the tilt of the block 2.

Then the block is inverted with its face 6 on the chuck as shown in Figs. 1 and 2 so that with the tool-bit clamped in the slot 16, the block and wheel 26 are relatively moved so that the wheel acts on the upper side of the point of the bit to produce an upper surface 20 which inclines downwardly and rearwardly from the point.

Where it is desired or necessary it is possible to first produce the angular sides of the point such as 20 and 28. In such a case the bit is clamped in the slots 12 and 14 as shown in Fig. 1 for the action of the wheel subsequent to which the block may be reversed to produce the point as it is shown in Fig. 6. Where this procedure is followed, other set screws than shown may be provided.

The slots for the tool-bit are relatively disposed and the block is formed for a cooperative function so that a tool-bit may be acted upon by an abrasive wheel to produce the desired form of cutting tool.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A device for holding a tool-bit and supporting the same on a flat horizontal surface so that end portions of said bit are presented to the periphery of an abrasive wheel rotatable on a horizontal axis comprising in combination, a rectangular shaped block having front, rear, end and upper and lower supporting faces, said lower face disposed at right angles to said front and rear faces, said upper face disposed in non-parallel relation to said lower face and inclining forwardly from said rear to said front face, said forward face provided with lower relatively angularly disposed intersecting grooves extending from end to end of the block for holding a tool bit so that when said block is supported by its lower face opposite sides of the end of a bit projecting from the block may be presented to said wheel at certain angles and an upper groove disposed longitudinally and angularly relative to said lower face to hold a bit so that when the block is supported on its lower face the upper face of a bit projecting from the block may be presented to said wheel at a certain angle, and clamp means adapted to project into said grooves for engaging and clamping a bit therein, said upper face arranged when the block is supported thereby to tilt the same forwardly whereby a bit in a diagonal groove has its end portion projecting from the block presented to the periphery of a wheel at another certain angle.

EDWARD J. HART.